United States Patent
Kobussen et al.

[11] Patent Number: 5,997,919
[45] Date of Patent: Dec. 7, 1999

[54] METHOD AND APPARATUS FOR REMOVING BRINE FROM COEXTRUDED SAUSAGE STRANDS

[75] Inventors: Jaap Kobussen, La Veghel, Netherlands; Mart Kobussen; Jos Kobussen, both of Indianola, Iowa; Vincent Louis Basile, II, West Des Moines, Iowa

[73] Assignee: Townsend Engineering Company, Des Moines, Iowa

[21] Appl. No.: 09/036,596

[22] Filed: Mar. 6, 1998

[51] Int. Cl.⁶ ............................... A23B 4/02; B05C 11/02
[52] U.S. Cl. ...................... 426/105; 426/277; 426/573; 426/574; 118/18; 118/125; 99/494; 99/495; 99/535
[58] Field of Search ..................... 426/277, 573, 426/574, 105; 99/494, 495, 353, 535; 411/147, 159; 118/18, 125

[56] References Cited

U.S. PATENT DOCUMENTS

| 2,868,159 | 1/1959 | Lit et al. | 118/125 |
| 3,622,353 | 11/1971 | Bradshaw et al. | 99/169 |
| 4,624,817 | 11/1986 | Gusack et al. | 264/225 |

*Primary Examiner*—David Lacey
*Assistant Examiner*—Drew Becker
*Attorney, Agent, or Firm*—Zarley, McKee, Thomte, Voorhees & Sease

[57] ABSTRACT

A method and apparatus for coagulating a coextruded collagen gel on a sausage strand by removing residual brine from the strand after coagulation by passing the elongated sausage strand through an aperture of a flexible diaphragm having a diameter equal to that of the strand.

7 Claims, 3 Drawing Sheets

METHOD AND APPARATUS FOR REMOVING BRINE FROM COEXTRUDED SAUSAGE STRANDS

BACKGROUND OF THE INVENTION

The present invention relates to the preparation of collagen-coated foodstufs, especially sausages.

There are two approaches to making sausages. The first is to take natural or artificial sausage casing and stuff it with sausage meat. In recent times, it has become known to coextrude a strand of sausage material which has an inner core of meat emulsion having an outer surface material that can be coagulated to provide an encasement for the strand. The outer surface material may consist of a gel with a collagen protein. The coagulation normally includes subjecting the extruded strand to a brine (salt) solution. Coagulation as used herein refers to the step of hardening and stabilization of the casing. This is principally done in two ways; firstly by removal of water from the collagen gel, and secondly by crosslinking the collagen fibers.

It is known that collagen is a protein able to form aqueous gels of high water content. Typically maximum gel water uptakes can be achieved at a pH around 2, and therefore, although technically a high pH is also possible (around 13), most extrusion gels contain acidified collagen fibers. In the generally known methods, the water content of the gel coating is lowered with the assistance of osmosis by leading the strand of foodstuffs through a concentrated salt bath. Said brine is preferably of a pH higher than the pH of the gel, preferably >pH=7, to lower the water binding ability of the gel, and thus facilitate the osmotic drying. The brine may include any type of suitable food approved salt. The brine may also contain other functional ingredients such as crosslinking agents, plasticizing agents or fibrous or other coating materials. A typical sausage coextrusion process is described in U.S. Pat. No. 3,622,353, Bradly, et al. In practice this process includes the steps of coextruding a substantially uniform layer of collagen gel around an extruded edible product, whereby the collagen is coagulated by passing the extruded strand of foodstuff through a brine bath and successively air drying the casing. Said brine bath typically contains a concentrated solution of sodium chloride, and consists of a shallow trough, through which a conveyor belt transports the coextruded strand. Optionally, the brine treatment includes spraying the brine onto the sausage surface. Typical brine contact times in the past are 1.5–5 seconds.

In more recent times, sausage coextrusion methods involve a prolonged brine contact period. These methods achieve a better coagulation to create a stronger casing. In these processes, brine contact lasts 30–300 seconds.

The longer contact times of the brine presents certain problems. First of all, the organoleptical properties of the sausage and casing such as taste, color, transparency are negatively influenced. It is therefore necessary to limit the brine contact time in order not to deteriorate the sausage quality. Low taste salts as sodium carbonate are therefore used, but still side effects are occurring and are difficult to maintain at an acceptable level.

The fact that salt remains on the sausage surface after leaving the brine bath increases these problems. When the sausage is thereafter air dried, salt crystals form on the sausage surface, giving an unwanted salty appearance and deteriorating the transparency of the casing. Also, taste is negatively influenced, as is the color of the meat.

A further problem with salt being "lost" in the production is the costs thereof. Recently used salt types are far more expensive than the customary sodium chloride. Salt loss has therefore become an important factor in overall production costs of the sausage. An even further disadvantage of the residual brine is that the overall mineral content of the sausage product is raised, which can go beyond the maximum levels set by governmental regulations.

It is therefore a principal object of the present invention to provide a method for manufacturing coextruded food strands with an edible casing in which the previous problems and disadvantages of the known coextrusion methods do not occur.

It is a further object of the present invention to provide a novel method for reducing unwanted organoleptical effects of a brine treatment on a coextruded food product.

It is still a further object of the present invention to provide a method for substantially reducing residual brine left on the surface of coextruded food strands.

It is yet a further object of the present invention to provide a method of coagulating collagen containing gel in the coextrusion process whereby the brine costs are substantially reduced.

It is yet a further object of the present invention to provide a method of coagulating collagen containing gel to achieve a better coagulation through higher brine residence times, without negatively influencing the organolptical properties of the food product.

It is still a further object to the present invention to provide a means for removal of surface attached brine from a coagulated collagen coated coextruded foodstuff.

An additional object of the present invention is to create by coextrusion a substantially uniform layer of a collagen-containing gel around an elongated strand of foodstuff, coagulating said foodstuff by contacting it with a salt-containing brine, removing residual brine left on the surface of said foodstuff after said contact with the brine, and recirculating the removed brine for reuse.

These and other objects will become clear from the following description of the invention.

SUMMARY OF THE INVENTION

The present invention discloses the method of and means for removal of residual brine surrounding an edible foodstuff in a coextrusion process. Preferably immediately after leaving the brine treatment zone, the coagulated collagen coated sausage strand is subjected to a blast of forced air; or to scrubbing; or to an electrolysis process. To enable a longer brine contact time than had been heretofore possible, exposure of the brine to the strands is conducted at lower brine temperatures. To reduce the brine treatment costs, the brine is recirculated for reuse.

DESCRIPTION OF THE PREFERRED EMBODIMENT

The present invention provides a process for coagulating coextruded collagen containing gel surround an edible foodstuff; i.e., sausages. Coextrusion methods are mainly being used for the coextrusion of sausage or sausage-like materials. While the instant process relates particularly to the production of sausages, it may also be used in the production of other collagen coated foodstuffs such as fish or meat products containing vegetable or cheese or both. Thus, while the description of the process will be in terms of the production of strings of sausages, the process is clearly not limited to that particular foodstuff. The term "sausage" as used herein refers to any type of emulsified food product that is formed into sausage or frankfurter links or the like.

The invention is neither limited to collagen coated foodstuffs, but may also be applied for coextruded foodstuffs.

The numeral 10 designates the discharge end on a conveyor 12 of a machine for creating a dual-extruded sausage strand 14 having an outer collagen layer 16 which is cured, at least in part, by a brine solution. Such a machine is disclosed in co-pending U.S. application Ser. No. 08/722,163 (filed Oct. 15, 1996) which is incorporated herein by reference. This invention deals with the concept of removing the brine solution from the outer surface of the strand 14 for all the reasons discussed heretofore.

Figure 2:
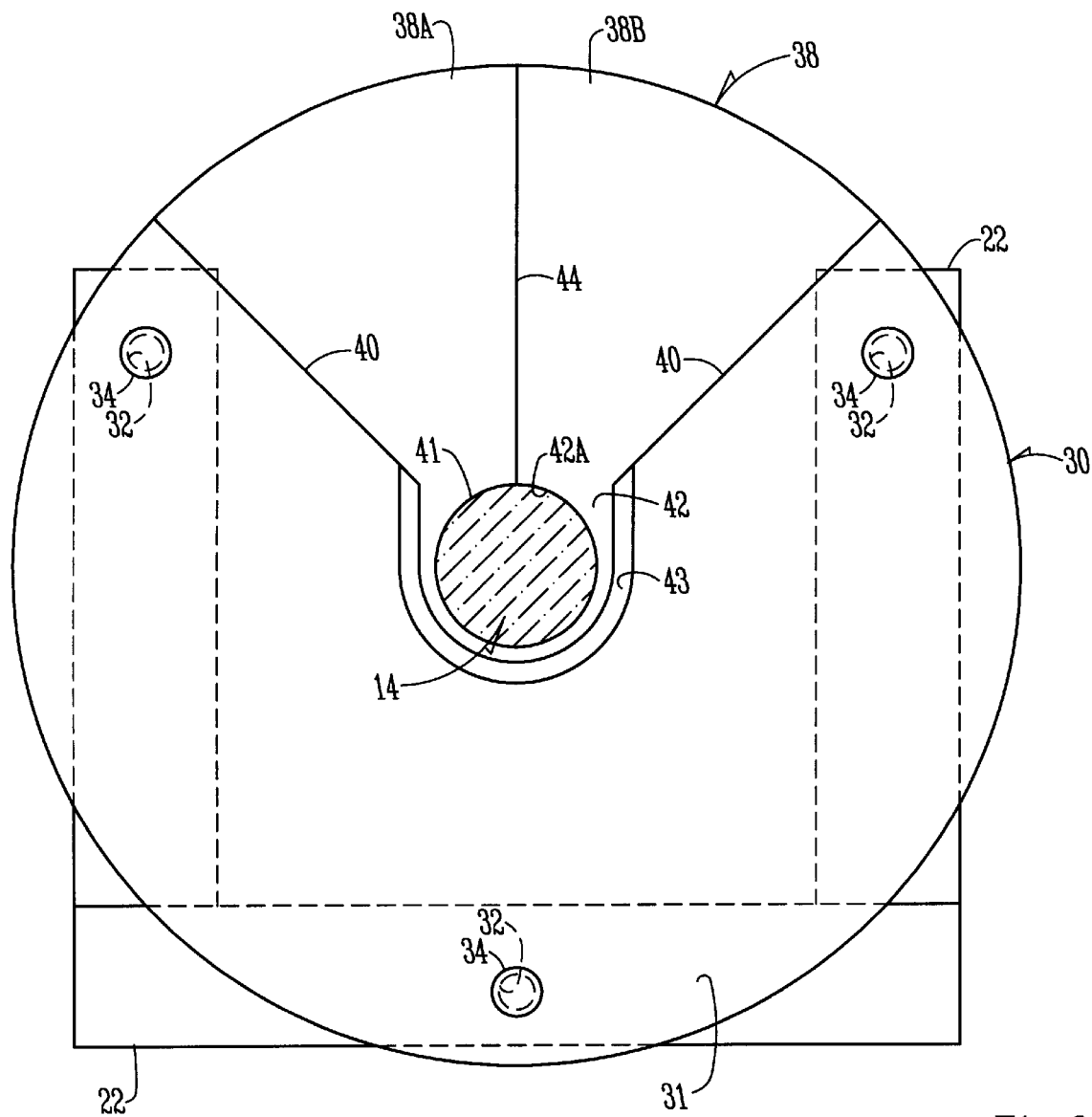
FIG. 2 is a side elevational view thereof as viewed from the bottom of FIG. 1.
Figure 3:
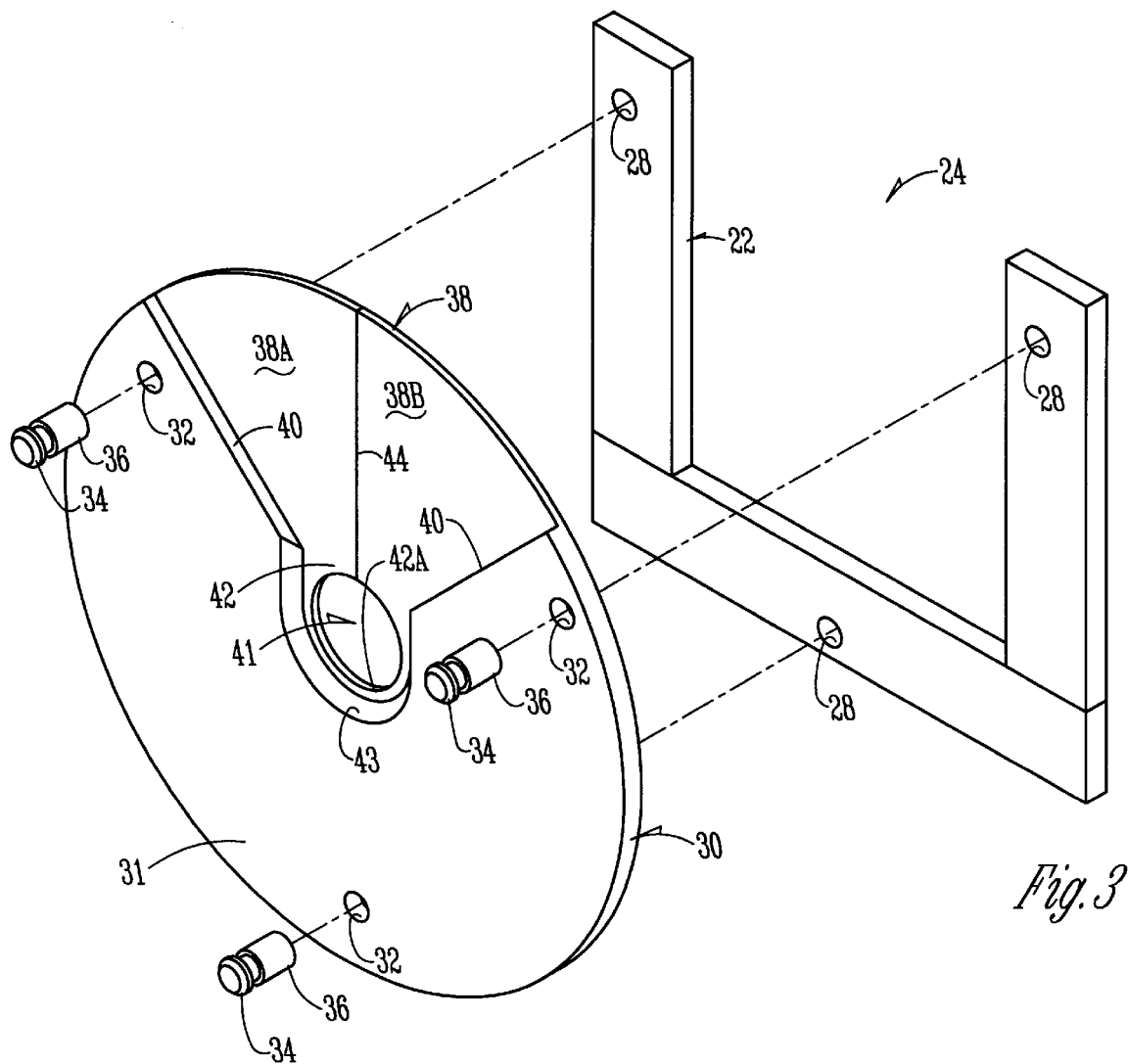
FIG. 3 is a perspective exploded view of the preferred surface brine removal apparatus.

The conveyor belt 12 is rotatably mounted around bearing 18 mounted on the conveyor frame 20. A U-shaped frame 22 having an open center 24 is mounted in any convenient way (FIG. 3) to frame 20. Three apertures 28 are located in frame 22 (FIG. 2). A wiping diaphragm 30 is circular in shape, and has a forward flat surface 31. It also has three apertures 32 therein that register with apertures 28 in frame 22. Bolt assemblies 34 extend through registered apertures 28 and 22 to secure diaphragm 30 to frame 22. Spacers 36 hold diaphragm 30 in spaced relation to frame 22 to permit better deflection between frame 22 and diaphragm 30. Diaphragm 30 is comprised of a thin flexible plastic member approximately 3/16 of an inch thick and approximately five inches in diameter. A portion 38 of diaphragm 30 has radial side edges 40 which define an angle of approximately 90° with respect to each other. The thickness of portion 38 has a reduced thickness of approximately 1/16 of an inch to enhance its flexibility.

Diaphragm 30 has a center opening 41 which is surrounded by a U-shaped portion 42 of portion 38. The side edges 40 of portion 38 are normal to the portion 38. The inner ends of edges 40 terminate in a tapered edge 43 which extends between surface 31 and portion 38. A vertically disposed slit 44 is cut in portion 38 and extends upwardly from the center of center opening 41 to create resiliently aligned mating flaps 38A and 38B in portion 38.

The diameter of center opening 41 is approximately the same as the outer diameter of strand 14. The opening 41 has a circular edge 42A which is adapted to scrape the outer surface 16 of strand 14 as strand 14 moves through opening 41, as will be discussed hereafter. The diameter of opening 14 should conform to the diameter of the strand 14, and can be enlarged in a similar diaphragm 30 but with a larger opening 41 that may allow passage of a larger diameter strand 14 to pass therethrough. The center of center opening 41 is in axial alignment with the center axis of strand 14 as it moves longitudinally from conveyor 12.

Figure 1:
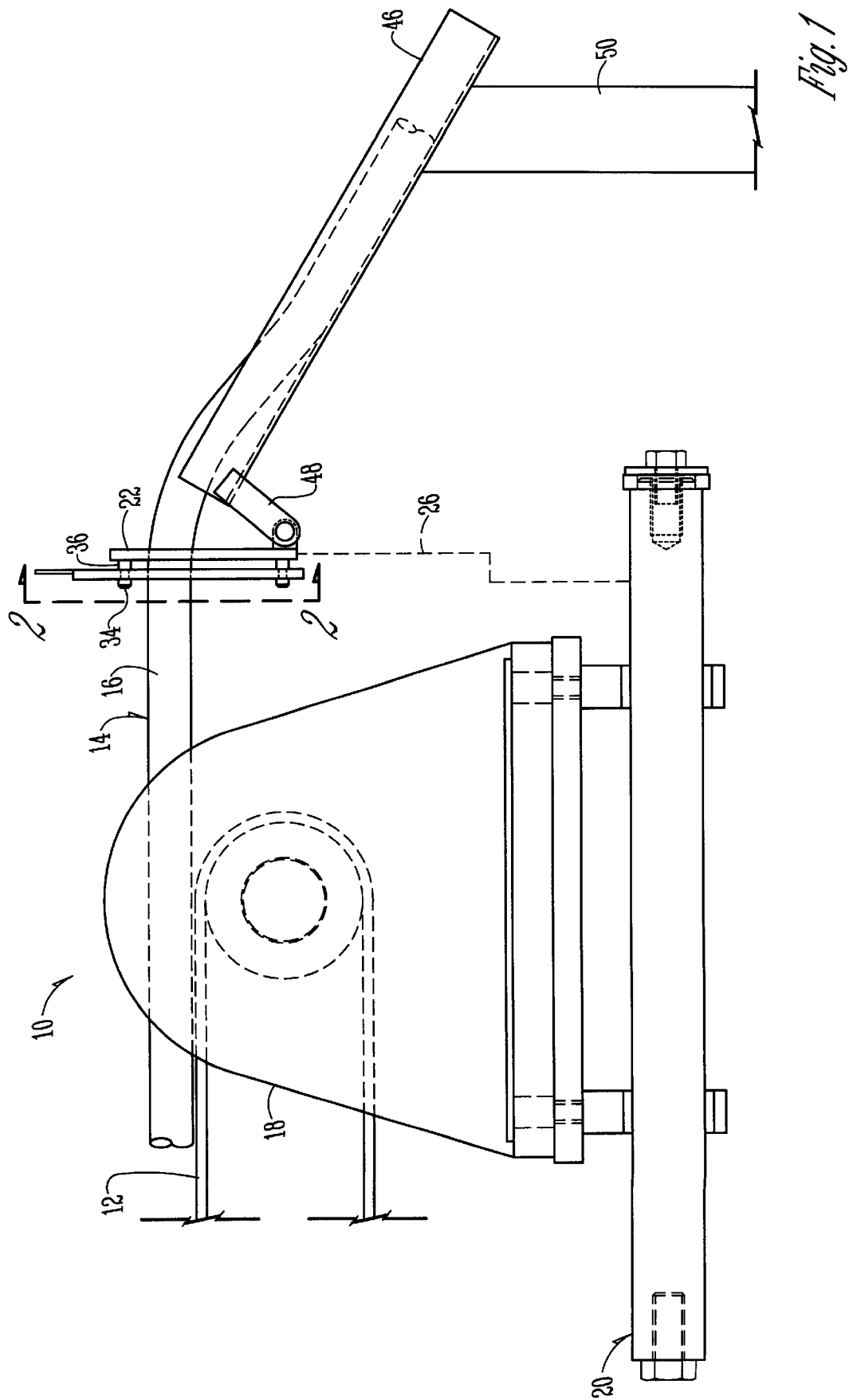
FIG. 1 is a plan view of a sausage extruder unit and an associated conveyor.

A chute 46 is supported in any convenient fashion by arm 48 and post 50 (FIG. 1) to slidably receive strand 14 after it passes through aperture 41.

In operation, a diaphragm 30 is selected which has a center opening 41 which matches the outer diameter of strand 14. The flaps 38A and 38B are manually spaced apart and the outer end of strand 14 is moved through the then open slit 44. Upon release of the flaps 38A and 38B, the edge 42A of opening 41 closes on and engages the surface 16 of strand 14. This is preferably done while the conveyor belt 10 is not moving, and the extruding machine has been stopped. With strand 14 in opening 41, the operation of the sausage extruding machine and conveyor belt 12 is then resumed, which moves the strand 14 through opening 41 whereupon edge 42A scrapes the brine residue from the surface 16 of the strand.

The brine residue removal can also be accomplished by rinsing the sausage strand with an ethanol fluid, for a time sufficient to remove said brine substantially. Ethanol fluid is useful to further dehydrate the casing. The dehydrating fluid may be recirculated for reuse. Adding functional additives to the ethanol fluid, such as crosslinking agents, coloring agents or plasticizing agents, are advantageous.

A second alternative suitable method for removing the brine is through forced air blowing. Compressed air is forced through a narrowed passage (not shown) in proximity to the moving elongated coextruded foodstuff. The force of the air will blow surface brine off of the passing foodstuff strand. Preferably, the narrowed passage has a circular shape through which the sausage strand passes, in order to subject the sausage surface completely with the forced air. The removed brine is also preferably reused.

A third suitable method involves electro-chemically removing excess brine. This method is based on the principal that the brine serves as an electrolyte. An electrode potential between dipoles, will attract the salt ions. A practical embodiment of this method is by passing the coextruded elongated sausage strand, after it leaves the brine treatment section, through a "brine-removal bath". This bath is filled with a fluid and equipped with an electrical potential strong enough to substantially attract the salt-ions away from the sausage surface, with the ions being deposited and removed from electrodes. The fluid may be water, or a dehydrating fluid as described above, and may contain other functional additives.

From the foregoing, it is seen that this invention will achieve at least all of its stated objectives.

What is claimed is:

1. A process for coagulating the outer surface of a coextruded food product comprising;

coextruding a strand of food material to create a substantially uniform layer of collagen-containing gel around an inner core of food material, subjecting said strand with a coagulation solution to coagulating said layer of gel on said strand placing the strand in an aperture of a flexible member by moving the strand through a slit extending from the outer edge of the flexible member to the aperture; and mechanically removing any residue of said coagulation solution from said strand after coagulation by passing said strand through the aperture in the flexible member.

2. The process of claim 1 wherein the residue of said coagulation solution is removed from said strand by scrubbing the strand surface with a flexible material.

3. The process of claim 1 wherein said scrubbing takes place by passing said strand through an aperture in a flexible member having a diameter substantially the same as that of said strand.

4. A process according to claim 1, whereby the removing step is effected by:

spacing apart flaps created by a slit in the flexible member to allow the strand to be placed within an aperture in said flexible member, said slit extending from the aperture to the outer edge of the flexible member;

releasing the flaps such that the edge of the aperture closes on and engages the surface of the strand; and moving the strand through the aperture, whereby the edge of the aperture scrubs the residue from the strand.

5. A machine for making a sausage strand with a coagulated outer surface, comprising, means for coextruding a sausage strand having an outer surface, means for coagulating said outer surface by the application of a brine bath, and mechanical means for removing any residual brine material on said strand after said coagulation is completed, wherein said mechanical means is a diaphragm composed of a flexible sheet member having a circular interior opening away from an outer edge, an elongated slit in said sheet member extending from said outer edge to said interior opening so that said sheet member can be deflected adjacent said slit to permit a sausage strand to be placed in said opening for longitudinal movement therethrough to be scraped by the portion of said sheet member around said opening.

6. The machine of claim 5 wherein said sheet member has a reduced thickness portion adjacent said slit and said opening.

7. The machine of claim 5 wherein the diameter of said opening is equal to that of the strand to be treated for removal of reduced brine material.

* * * * *